(12) United States Patent
Yeh et al.

(10) Patent No.: US 11,784,437 B2
(45) Date of Patent: *Oct. 10, 2023

(54) CARD CONNECTOR

(71) Applicant: V-GENERAL TECHNOLOGY CO., LTD., New Taipei (TW)

(72) Inventors: Po-Wen Yeh, New Taipei (TW); Hsuan Ho Chung, New Taipei (TW); Yung-Chang Lin, New Taipei (TW); Yu Hung Lin, New Taipei (TW); Tzu-Wei Yeh, New Taipei (TW); Yu-Lun Yeh, New Taipei (TW)

(73) Assignee: V-GENERAL TECHNOLOGY CO., LTD., New Taipei (TW)

( * ) Notice: Subject to any disclaimer, the term of this patent is extended or adjusted under 35 U.S.C. 154(b) by 219 days.

This patent is subject to a terminal disclaimer.

(21) Appl. No.: 17/349,869

(22) Filed: Jun. 16, 2021

(65) Prior Publication Data

US 2021/0399481 A1 Dec. 23, 2021

(30) Foreign Application Priority Data

Jun. 19, 2020 (TW) ................................ 109120801

(51) Int. Cl.
*H01R 4/02* (2006.01)
*H01R 13/6471* (2011.01)
(Continued)

(52) U.S. Cl.
CPC .......... *H01R 13/6471* (2013.01); *H01R 4/02* (2013.01); *H01R 13/15* (2013.01); *H01R 13/514* (2013.01); *H01R 13/6585* (2013.01)

(58) Field of Classification Search
CPC ...... H01R 13/6471; H01R 4/02; H01R 13/15; H01R 13/514; H01R 13/6585;
(Continued)

(56) References Cited

U.S. PATENT DOCUMENTS 11,437,745 B2 * 9/2022 Yeh ..................... H01R 13/6581
2001/0010983 A1 * 8/2001 Bricaud ............... G06K 7/0013
439/630

(Continued)

*Primary Examiner* — Truc T Nguyen
(74) *Attorney, Agent, or Firm* — Leong C. Lei

(57) ABSTRACT

A card connector includes a transmission conductor assembly that includes a backup transmission conductor, a first signal transmission conductor, an inspection signal transmission conductor, a first grounding transmission conductor, a command reset transmission conductor, a first differential transmission conductor, a second differential transmission conductor, a second grounding transmission conductor, a third grounding transmission conductor, a fourth grounding transmission conductor, a first power transmission conductor, a second power transmission conductor, a third differential transmission conductor, a fourth differential transmission conductor, a second signal transmission conductor, a fifth grounding transmission conductor, a sixth grounding transmission conductor, a seventh grounding transmission conductor, a fifth differential transmission conductor, a sixth differential transmission conductor, and a write-protection transmission conductor, each of which has two ends respectively forming a spring section and soldering section. The soldering sections, being so arranged, achieve advantages of bettering high frequency performance, reducing capacitive effect, and suppressing electromagnetic radiation interference.

20 Claims, 8 Drawing Sheets

(51) Int. Cl.
*H01R 13/15* (2006.01)
*H01R 13/514* (2006.01)
*H01R 13/6585* (2011.01)

(58) Field of Classification Search
CPC .... H01R 12/73; H01R 13/6594; H01R 12/57; H01R 12/714; H01R 12/716; G06K 7/0082; G06K 7/0021
See application file for complete search history.

(56) References Cited

U.S. PATENT DOCUMENTS

| | | | | |
|---|---|---|---|---|
| 2004/0127081 | A1* | 7/2004 | Chou | G06K 7/0043 439/188 |
| 2005/0227520 | A1* | 10/2005 | Wu | G06K 7/0021 439/159 |
| 2007/0249202 | A1* | 10/2007 | Ting | H01R 13/703 439/159 |
| 2009/0286416 | A1* | 11/2009 | Wu | H01R 12/7094 439/328 |
| 2014/0051297 | A1* | 2/2014 | Chan | H01R 13/7033 439/626 |
| 2018/0138614 | A1* | 5/2018 | Zhao | H01R 12/721 |
| 2019/0272453 | A1* | 9/2019 | Argyres | H01R 13/24 |
| 2020/0144749 | A1* | 5/2020 | Chen | H01R 12/774 |
| 2023/0085031 | A1* | 3/2023 | Ramesh | G06Q 20/382 |

\* cited by examiner

CARD CONNECTOR

TECHNICAL FIELD OF THE INVENTION

The present invention relates to a card connector, and more particularly to a card connector featuring bettered high frequency performance, reduced capacitive effect, and suppressed electromagnetic radiation interference.

DESCRIPTION OF THE PRIOR ART

Security Digital, commonly abbreviated as SD, refers to a memory card, which is widely used in portable devices, such as digital cameras, personal digital assistants (PDAs), and multimedia players. SD technology is based on the MultiMediaCard (MMC) format. The SD card has a relatively high data transmission rate and is constantly updating the standards thereof. Most of the SD cards are provided with, on a lateral side thereof, with write protection control to prevent accidental data writing in the card. Some of the SD cards even support digital copyright management technology. The size of the SD cards is 32 mm×24 mm×2.1 mm. However, officially, there is a thinned version having a thickness of 1.4 mm, similar to the MMC cards. The SD card is also referred to as an internal storage card or a memory card in the Chinese-speaking areas.

Generally speaking, the SD card requires multiple contact points for connection, and consequently, an SD receptacle also includes multiple terminal sets, which are of the same number and corresponding to such contact points. Due to such a large number of terminals, mutual interference may be quite possibly induced between the terminals, and a capacitive effect may be generated.

SUMMARY OF THE INVENTION

The primary objective of the present invention is to realize advantages of bettering high frequency performance, reducing the capacitive effect, and suppressing electromagnetic radiation interference by providing an arrangement of soldering sections.

To achieve the above objective, the present invention comprises a transmission conductor assembly. A structure of the transmission conductor assembly mainly comprises: a backup transmission conductor, a first signal transmission conductor, an inspection signal transmission conductor, a first grounding transmission conductor, a command reset transmission conductor, a first differential transmission conductor, a second differential transmission conductor, a second grounding transmission conductor, a third grounding transmission conductor, a fourth grounding transmission conductor, a first power transmission conductor, a second power transmission conductor, a third differential transmission conductor, a fourth differential transmission conductor, a second signal transmission conductor, a fifth grounding transmission conductor, a sixth grounding transmission conductor, a seventh grounding transmission conductor, a fifth differential transmission conductor, a sixth differential transmission conductor, and a write-protection transmission conductor;

wherein the first signal transmission conductor has two ends that are extended to respectively form a first signal soldering section and a first signal spring section, and the first signal soldering section is located at one side of the backup soldering section;

the inspection signal transmission conductor has two ends that are extended to respectively form an inspection signal soldering section and an inspection signal spring section, and the inspection signal soldering section is located at one side of the first signal soldering section that is distant from the backup soldering section, and the inspection signal spring section is located at one side of the first signal spring section;

the first grounding transmission conductor has two ends that are extended to respectively form a first grounding soldering section and a first grounding spring section, and the first grounding soldering section is located at one side of the inspection signal soldering section that is distant from the first signal soldering section, and the first grounding spring section is located at one side of the backup spring section;

the command reset transmission conductor has two ends that are extended to respectively form a command reset soldering section and a command reset spring section, and the command reset soldering section is located at one side of the first grounding soldering section that is distant from the inspection signal soldering section, and the command reset spring section is located at one side of the inspection signal spring section that is distant from the first signal spring section;

the first differential transmission conductor has two ends that are extended to respectively form a first differential soldering section and a first differential spring section, and the first differential soldering section is located at one side of the command reset soldering section that is distant from the first grounding soldering section, and the first differential spring section is located at one side of the first grounding spring section;

the second differential transmission conductor has two ends that are extended to respectively form a second differential soldering section and a second differential spring section, and the second differential soldering section is located at one side of the first differential soldering section that is distant from the command reset soldering section, and the second differential spring section is located at one side of the first differential spring section that is distant from the first grounding spring section;

the second grounding transmission conductor has two ends that are extended to respectively form a second grounding soldering section and a second grounding spring section, and the second grounding soldering section is located at one side of the second differential soldering section that is distant from the first differential soldering section, and the second grounding spring section is located at one side of the command reset spring section that is distant from the inspection signal spring section;

the third grounding transmission conductor has two ends that are extended to respectively form a third grounding soldering section and a third grounding spring section, and the third grounding soldering section is located at one side of the second grounding soldering section that is distant from the second differential soldering section, and the third grounding spring section is located at one side of the second differential spring section that is distant from the first differential spring section;

the fourth grounding transmission conductor has two ends that are extended to respectively form a fourth grounding soldering section and a fourth grounding spring section, and the fourth grounding soldering section is located at one side of the third grounding soldering section that is distant from the second grounding soldering section, and the fourth grounding spring section is located at one side of the second grounding spring section that is distant from the command reset spring section;

the first power transmission conductor has two ends that are extended to respectively form a first power soldering section and a first power spring section, and the first power soldering section is located at one side of the fourth grounding soldering section that is distant from the third grounding soldering section, and the first power spring section is located at one side of the third grounding spring section that is distant from the second differential spring section;

the second power transmission conductor has two ends that are extended to respectively form a second power soldering section and a second power spring section, and the second power soldering section is located at one side of the first power soldering section that is distant from the fourth grounding soldering section, and the second power spring section is located at one side of the fourth grounding spring section that is distant from the second grounding spring section;

the third differential transmission conductor has two ends that are extended to respectively form a third differential soldering section and a third differential spring section, and the third differential soldering section is located at one side of the second power soldering section that is distant from the first power soldering section, and the third differential spring section is located at one side of the first power spring section that is distant from the third grounding spring section;

the fourth differential transmission conductor has two ends that are extended to respectively form a fourth differential soldering section and a fourth differential spring section, and the fourth differential soldering section is located at one side of the third differential soldering section that is distant from the second power soldering section, and the fourth differential spring section is located at one side of the third differential spring section that is distant from the first power spring section;

the second signal transmission conductor has two ends that are extended to respectively form a second signal soldering section and a second signal spring section, and the second signal soldering section is located at one side of the fourth differential soldering section that is distant from the third differential soldering section, and the second signal spring section is located at one side of the second power spring section that is distant from the fourth grounding spring section;

the fifth grounding transmission conductor has two ends that are extended to respectively form a fifth grounding soldering section and a fifth grounding spring section, and the fifth grounding soldering section is located at one side of the second signal soldering section that is distant from the fourth differential soldering section, the fifth grounding spring section is located at one side of the fourth differential spring section that is distant from the third differential spring section;

the sixth grounding transmission conductor has two ends that are extended to respectively form a sixth grounding soldering section and a sixth grounding spring section, and the sixth grounding soldering section is located at one side of the fifth grounding soldering section that is distant from the second signal soldering section, and the sixth grounding spring section is located at one side of the second signal spring section that is distant from the second power spring section;

the seventh grounding transmission conductor has two ends that are extended to respectively form a seventh grounding soldering section and a seventh grounding spring section, and the seventh grounding soldering section is located at one side of the sixth grounding soldering section that is distant from the fifth grounding soldering section, and the seventh grounding spring section is located at one side of the fifth grounding spring section that is distant from the fourth differential spring section;

the fifth differential transmission conductor has two ends that are extended to respectively form a fifth differential soldering section and a fifth differential spring section, and the fifth differential soldering section is located at one side of the seventh grounding soldering section that is distant from the sixth grounding soldering section, and the fifth differential spring section is located at one side of the sixth grounding spring section that is distant from the second signal spring section;

the sixth differential transmission conductor has two ends that are extended to respectively form a sixth differential soldering section and a sixth differential spring section, and the sixth differential soldering section is located at one side of the fifth differential soldering section that is distant from the seventh grounding soldering section, and the sixth differential spring section is located at one side of the fifth differential spring section that is distant from the sixth grounding spring section; and the write-protection transmission conductor has two ends that are extended to respectively form a write-protection grounding soldering section and a write-protection spring section, and the write-protection grounding soldering section is located at one side of the sixth differential soldering section that is distant from the fifth differential soldering section, and the write-protection spring section is located at one side of the seventh grounding spring section that is distant from the fifth grounding spring section.

Based on the above structure, the first differential soldering section and the second differential soldering section, the third differential soldering section and the fourth differential soldering section, and the fifth differential soldering section and the sixth differential soldering section are arranged side by side in a pairwise form, and the third grounding soldering section is arranged between the first and second differential soldering sections and the third and fourth differential soldering sections; and the fifth grounding soldering section and the sixth grounding soldering section are arranged between the third and fourth differential soldering sections and the fifth and sixth differential soldering sections, so that capacitive effect can be reduced and thus bettering of the high frequency performance and suppressing of electromagnetic radiation interference can be realized.

DETAILED DESCRIPTION OF THE PREFERRED EMBODIMENT

Figure 1:
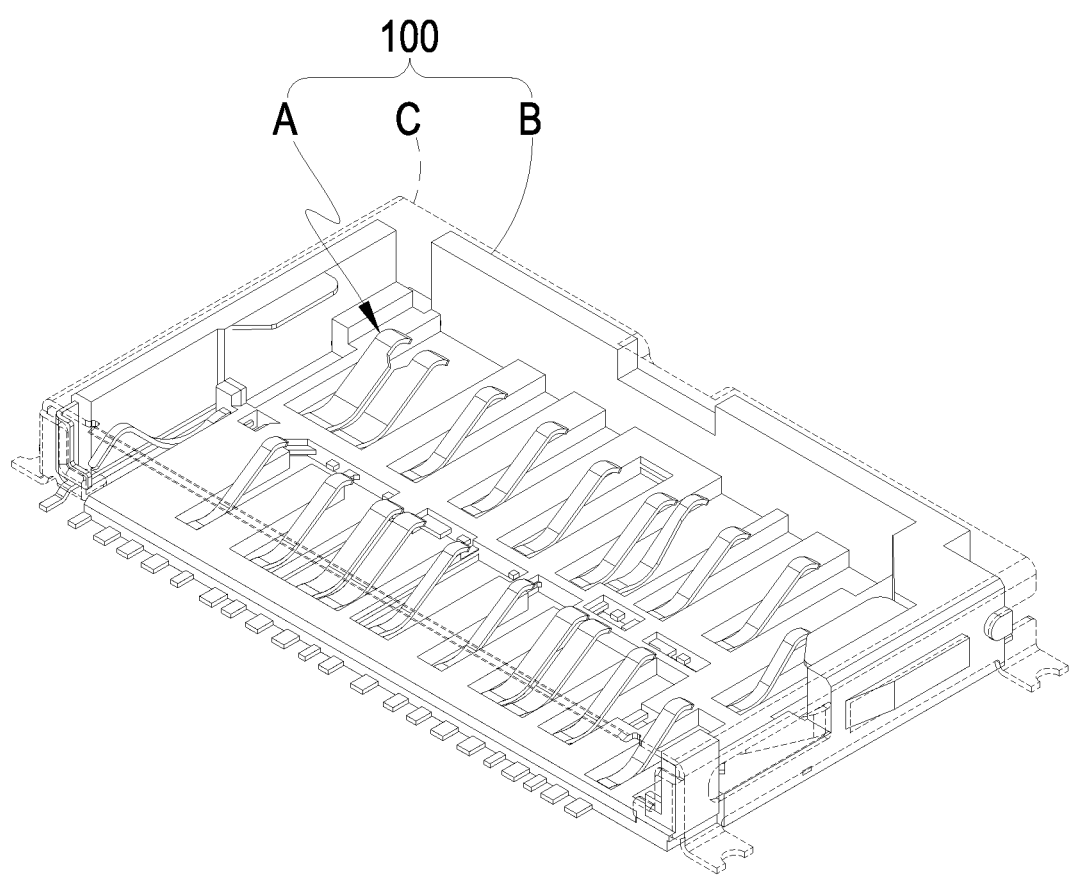
FIG. 1 is a perspective view showing the present invention.
Figure 2:
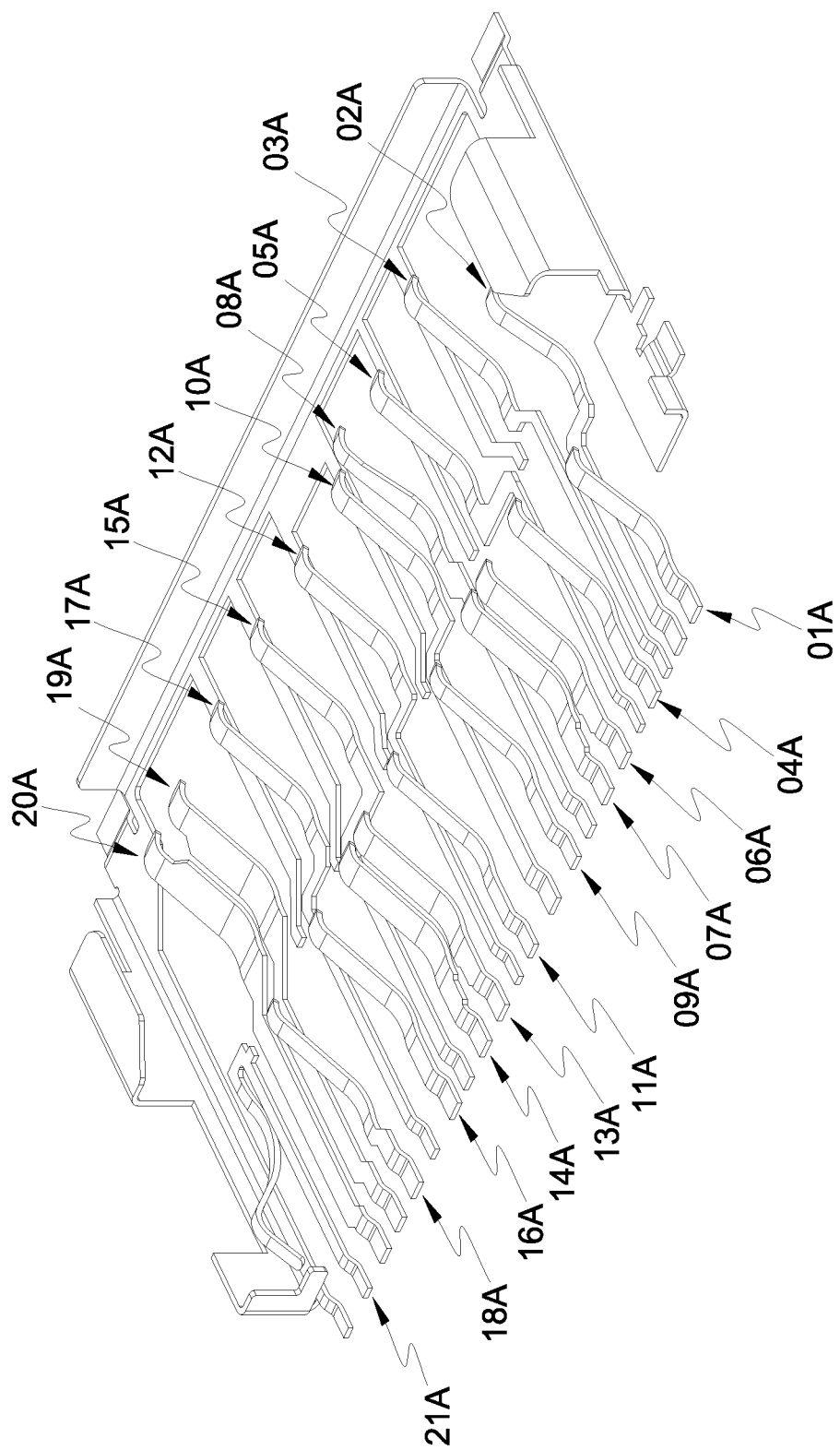
FIG. 2 is a schematic view showing a transmission conductor assembly of the present invention.
Figure 3:
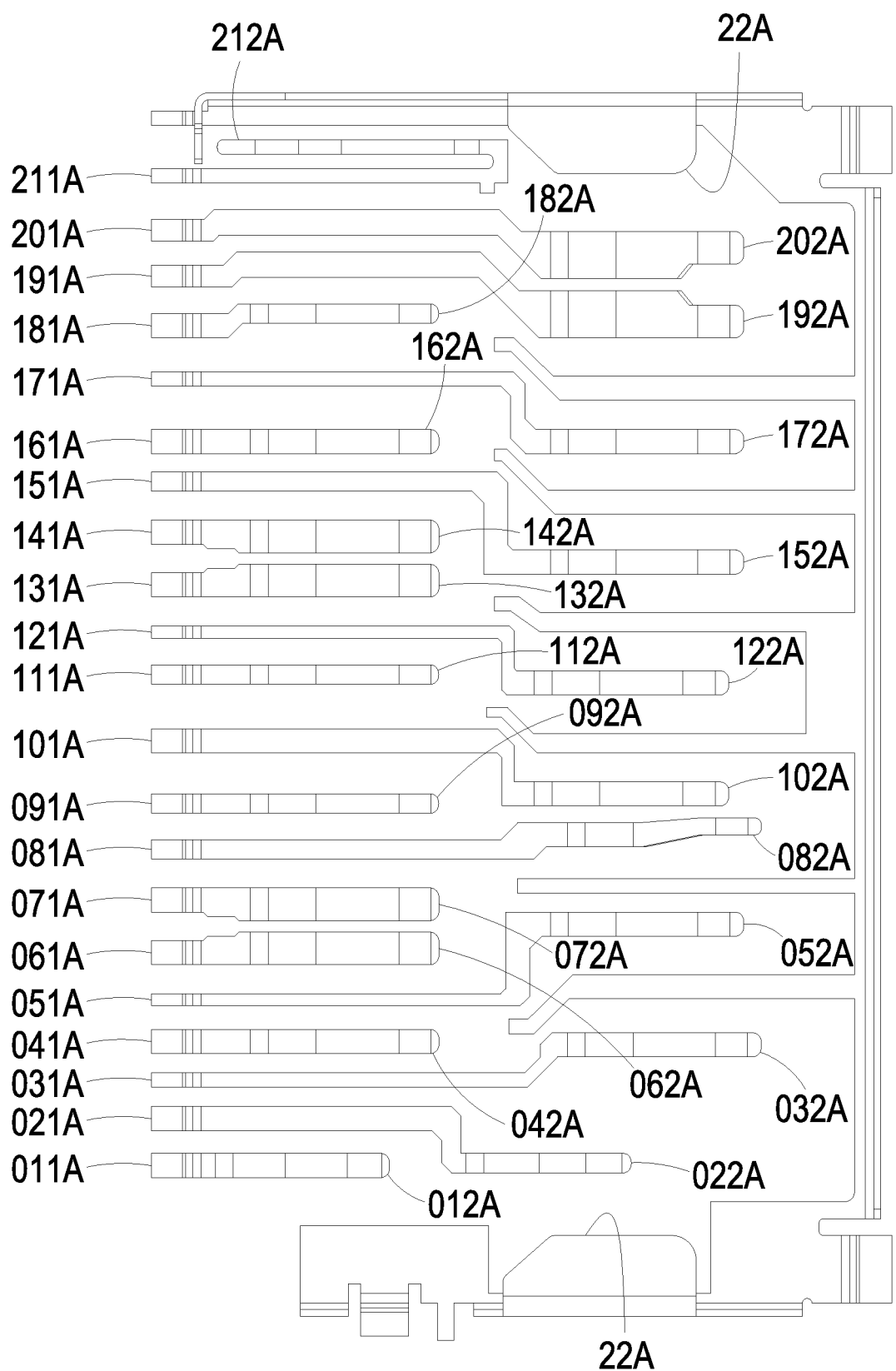
FIG. 3 is another schematic view showing the transmission conductor assembly of the present invention.
Figure 4:
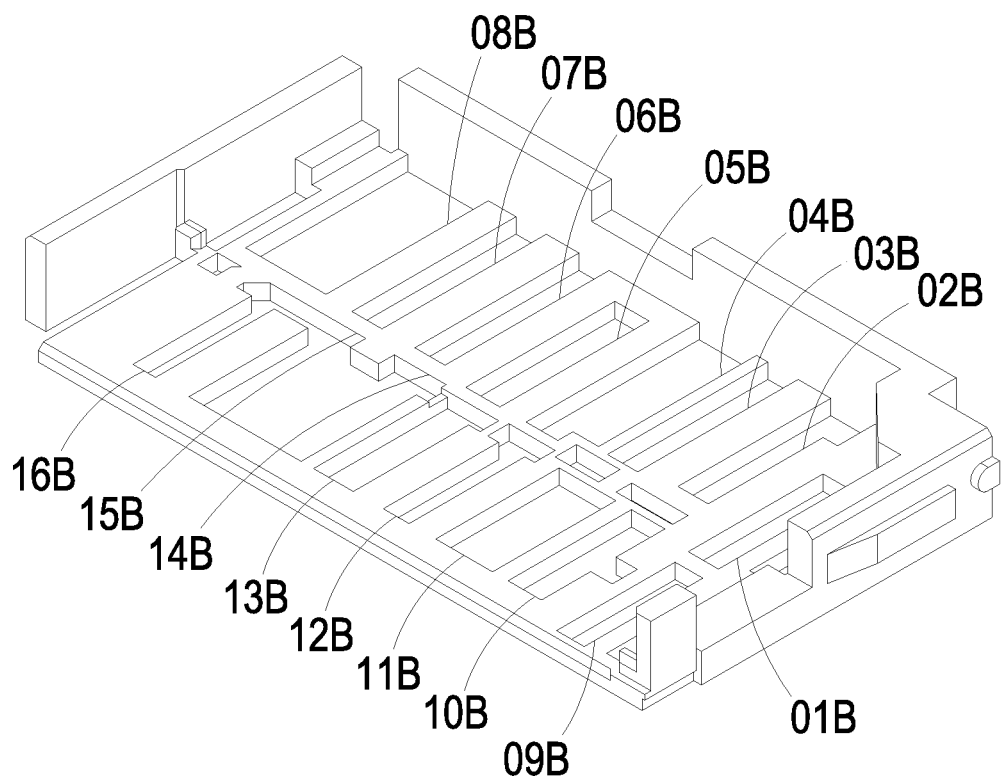
FIG. 4 is a schematic view showing an insulative plastic body of the present invention.
Figure 5:
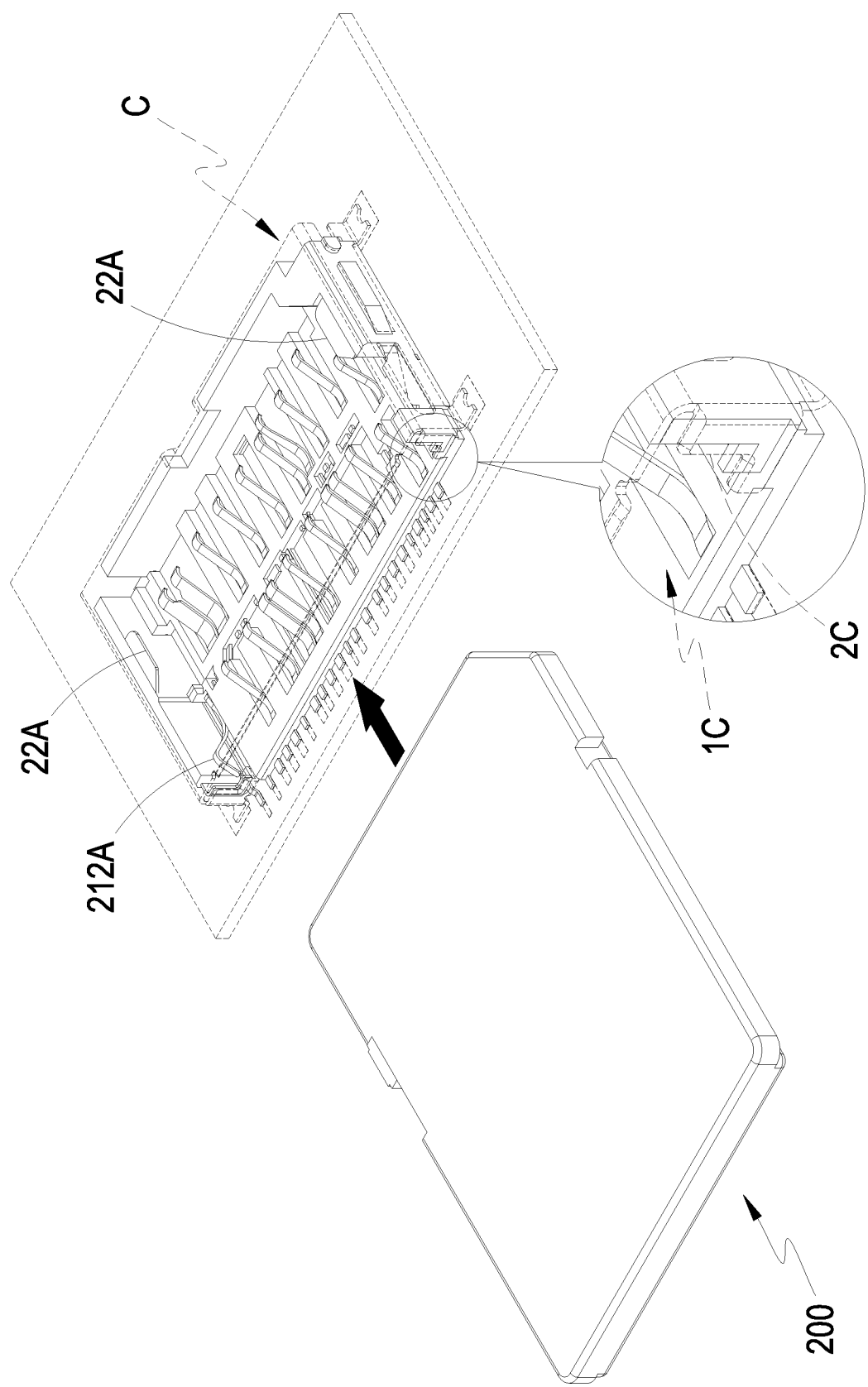
FIG. 5 is a schematic view demonstrating insertion according the present invention.
Figure 6:
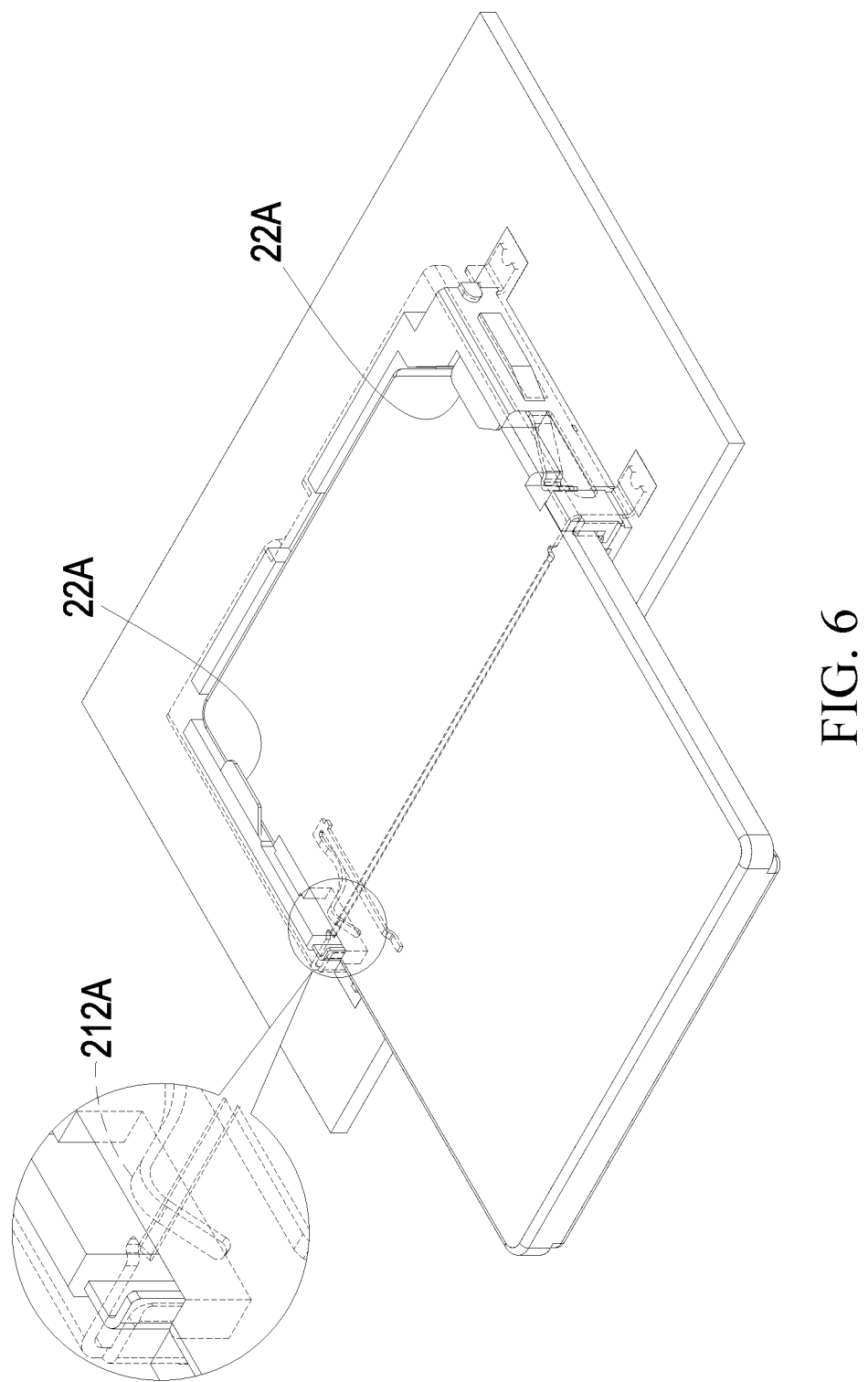
FIG. 6 is a schematic view demonstrating retaining engagement according to the present invention.
Figure 7:
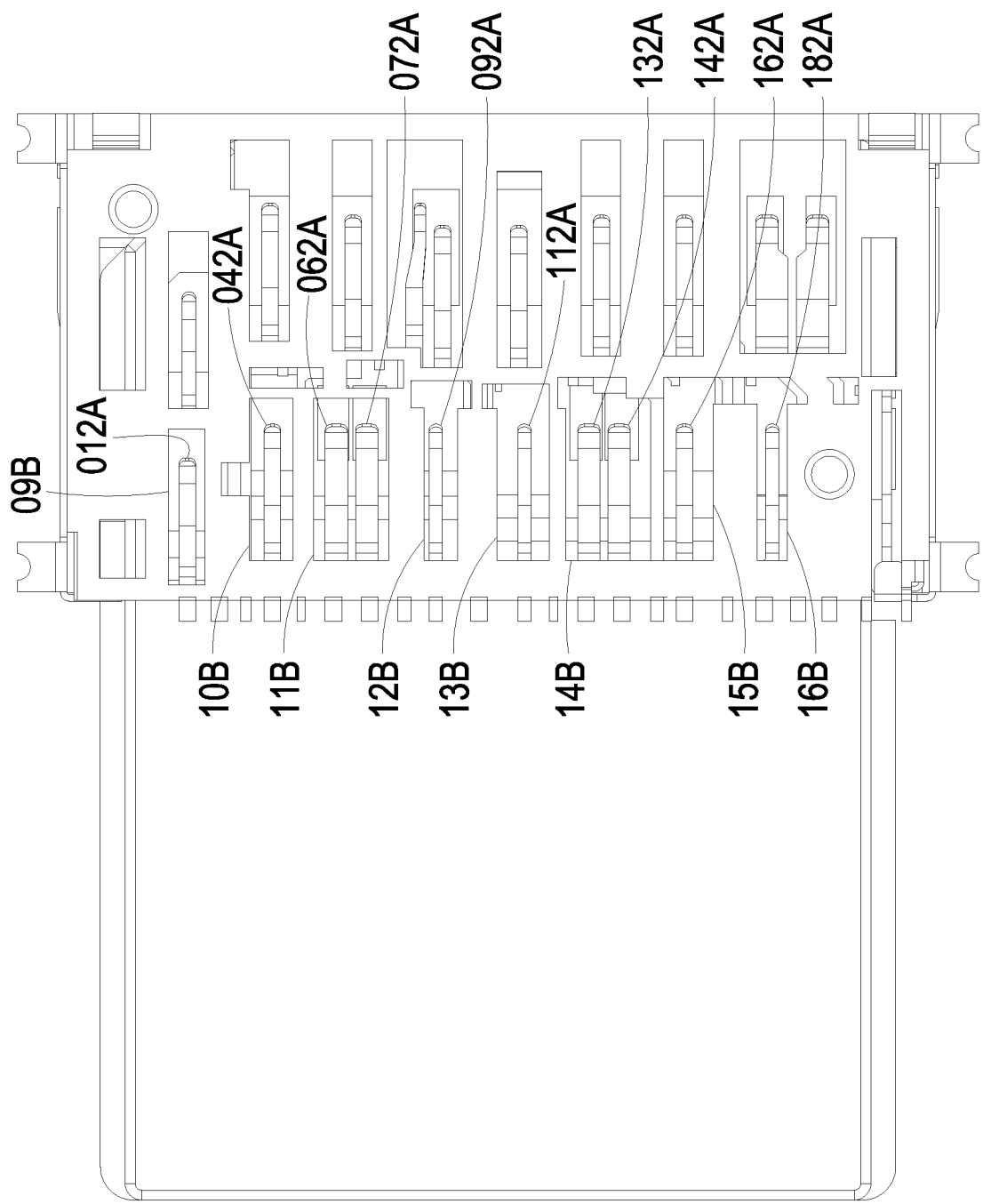
FIG. 7 is a schematic view demonstrating contacting according to the present invention.
Figure 8:
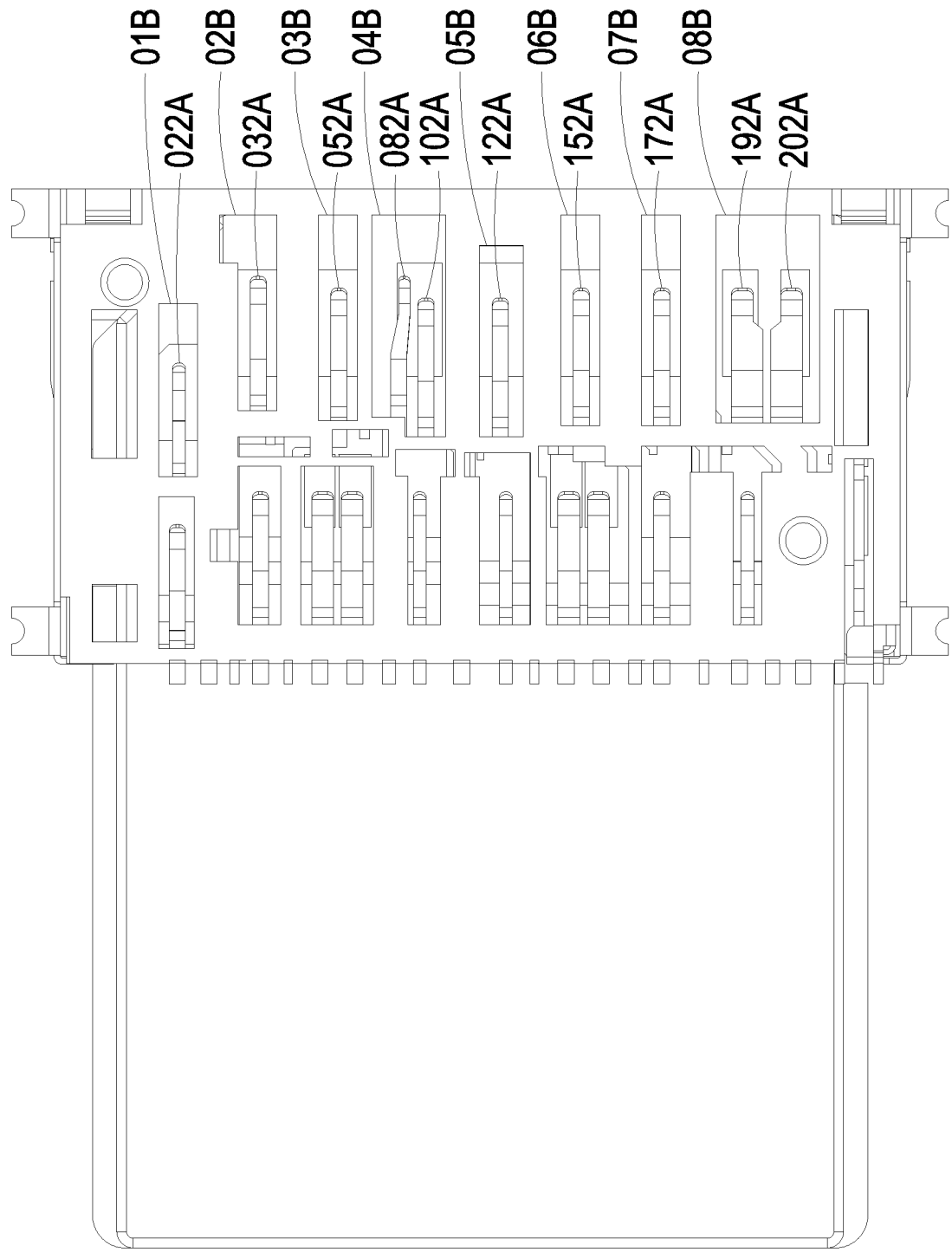
FIG. 8 is another schematic view demonstrating contacting according to the present invention.

Referring to FIGS. 1-5, the drawings clearly show the present invention provides a card connector 100. The card connector 100 comprises a transmission conductor assembly A, an insulative plastic body B arranged outside the transmission conductor assembly A, and a shielding case C arranged outside the insulative plastic body B. The transmission conductor assembly A comprises:

a backup transmission conductor 01A, wherein the backup transmission conductor 01A has two ends that are extended to respectively form a backup soldering section 011A and a backup spring section 012A;

a first signal transmission conductor 02A, wherein the first signal transmission conductor 02A has two ends that are extended to respectively form a first signal soldering section 021A and a first signal spring section 022A, and the first signal soldering section 021A is located at one side of the backup soldering section 011A;

an inspection signal transmission conductor 03A, wherein the inspection signal transmission conductor 03A has two ends that are extended to respectively form an inspection signal soldering section 031A and an inspection signal spring section 032A, and the inspection signal soldering section 031A is located at one side of the first signal soldering section 021A that is distant from the backup soldering section 011A, and the inspection signal spring section 032A is located at one side of the first signal spring section 022A;

a first grounding transmission conductor 04A, wherein the first grounding transmission conductor 04A has two ends that are extended to respectively form a first grounding soldering section 041A and a first grounding spring section 042A, and the first grounding soldering section 041A is located at one side of the inspection signal soldering section 031A that is distant from the first signal soldering section 021A, and the first grounding spring section 042A is located at one side of the backup spring section 012A;

a command reset transmission conductor 05A, wherein the command reset transmission conductor 05A has two ends that are extended to respectively form a command reset soldering section 051A and a command reset spring section 052A, and the command reset soldering section 051A is located at one side of the first grounding soldering section 041A that is distant from the inspection signal soldering section 031A, and the command reset spring section 052A is located at one side of the inspection signal spring section 032A that is distant from the first signal spring section 022A;

a first differential transmission conductor 06A, wherein the first differential transmission conductor 06A has two ends that are extended to respectively form a first differential soldering section 061A and a first differential spring section 062A, and the first differential soldering section 061A is located at one side of the command reset soldering section 051A that is distant from the first grounding soldering section 041A, and the first differential spring section 062A is located at one side of the first grounding spring section 042A;

a second differential transmission conductor 07A, wherein the second differential transmission conductor 07A has two ends that are extended to respectively form a second differential soldering section 071A and a second differential spring section 072A, and the second differential soldering section 071A is located at one side of the first differential soldering section 061A that is distant from the command reset soldering section 051A, and the second differential spring section 072A is located at one side of the first differential spring section 062A that is distant from the first grounding spring section 042A;

a second grounding transmission conductor 08A, wherein the second grounding transmission conductor 08A has two ends that are extended to respectively form a second grounding soldering section 081A and a second grounding spring section 082A, and the second grounding soldering section 081A is located at one side of the second differential soldering section 071A that is distant from the first differential soldering section 061A, and the second grounding spring section 082A is located at one side of the command reset spring section 052A that is distant from the inspection signal spring section 032A;

a third grounding transmission conductor 09A, wherein the third grounding transmission conductor 09A has two ends that are extended to respectively form a third grounding soldering section 091A and a third grounding spring section 092A, and the third grounding soldering section 091A is located at one side of the second grounding soldering section 081A that is distant from the second differential soldering section 071A, and the third grounding spring section 092A is located at one side of the second differential spring section 072A that is distant from the first differential spring section 062A;

a fourth grounding transmission conductor 10A, wherein the fourth grounding transmission conductor 10A has two ends that are extended to respectively form a fourth grounding soldering section 101A and a fourth grounding spring section 102A, and the fourth grounding soldering section 101A is located at one side of the third grounding soldering section 091A that is distant from the second grounding soldering section 081A, and the fourth grounding spring section 102A is located at one side of the second grounding spring section 082A that is distant from the command reset spring section 052A;

a first power transmission conductor 11A, wherein the first power transmission conductor 11A has two ends that are extended to respectively form a first power soldering section 111A and a first power spring section 112A, and the first power soldering section 111A is located at one side of the fourth grounding soldering section 101A that is distant from the third grounding soldering section 091A, and the first power spring section 112A is located at one side of the third grounding spring section 092A that is distant from the second differential spring section 072A;

a second power transmission conductor 12A, wherein the second power transmission conductor 12A has two ends that are extended to respectively form a second power soldering section 121A and a second power spring section 122A, and the second power soldering section 121A is located at one side of the first power soldering section 111A that is distant from the fourth grounding soldering section 101A, and the second power spring section 122A is located at one side of the fourth grounding spring section 102A that is distant from the second grounding spring section 082A;

a third differential transmission conductor 13A, wherein the third differential transmission conductor 13A has two ends that are extended to respectively form a third differential soldering section 131A and a third differential spring section 132A, and the third differential soldering section 131A is located at one side of the second power soldering section 121A that is distant from the first power soldering section 111A, and the third differential spring section 132A is located at one side of the first power spring section 112A that is distant from the third grounding spring section 092A;

a fourth differential transmission conductor 14A, wherein the fourth differential transmission conductor 14A has two ends that are extended to respectively form a fourth differential soldering section 141A and a fourth differential spring section 142A, and the fourth differential soldering section 141A is located at one side of the third differential soldering section 131A that is distant from the second power soldering section 121A, and the fourth differential spring section 142A is located at one side of the third differential spring section 132A that is distant from the first power spring section 112A;

a second signal transmission conductor 15A, wherein the second signal transmission conductor 15A has two ends that are extended to respectively form a second signal soldering section 151A and a second signal spring section 152A, and the second signal soldering section 151A is located at one side of the fourth differential soldering section 141A that is distant from the third differential soldering section 131A, and the second signal spring section 152A is located at one side of the second power spring section 122A that is distant from the fourth grounding spring section 102A;

a fifth grounding transmission conductor 16A, wherein the fifth grounding transmission conductor 16A has two ends that are extended to respectively form a fifth grounding soldering section 161A and a fifth grounding spring section 162A, and the fifth grounding soldering section 161A is located at one side of the second signal soldering section 151A that is distant from the fourth differential soldering section 141A, the fifth grounding spring section 162A is located at one side of the fourth differential spring section 142A that is distant from the third differential spring section 132A;

a sixth grounding transmission conductor 17A, wherein the sixth grounding transmission conductor 17A has two ends that are extended to respectively form a sixth grounding soldering section 171A and a sixth grounding spring section 172A, and the sixth grounding soldering section 171A is located at one side of the fifth grounding soldering section 161A that is distant from the second signal soldering section 151A, and the sixth grounding spring section 172A is located at one side of the second signal spring section 152A that is distant from the second power spring section 122A;

a seventh grounding transmission conductor 18A, wherein the seventh grounding transmission conductor 18A has two ends that are extended to respectively form a seventh grounding soldering section 181A and a seventh grounding spring section 182A, and the seventh grounding soldering section 181A is located at one side of the sixth grounding soldering section 171A that is distant from the fifth grounding soldering section 161A, and the seventh grounding spring section 182A is located at one side of the fifth grounding spring section 162A that is distant from the fourth differential spring section 142A;

a fifth differential transmission conductor 19A, wherein the fifth differential transmission conductor 19A has two ends that are extended to respectively form a fifth differential soldering section 191A and a fifth differential spring section 192A, and the fifth differential soldering section 191A is located at one side of the seventh grounding soldering section 181A that is distant from the sixth grounding soldering section 171A, and the fifth differential spring section 192A is located at one side of the sixth grounding spring section 172A that is distant from the second signal spring section 152A;

a sixth differential transmission conductor 20A, wherein the sixth differential transmission conductor 20A has two ends that are extended to respectively form a sixth differential soldering section 201A and a sixth differential spring section 202A, and the sixth differential soldering section 201A is located at one side of the fifth differential soldering section 191A that is distant from the seventh grounding soldering section 181A, and the sixth differential spring section 202A is located at one side of the fifth differential spring section 192A that is distant from the sixth grounding spring section 172A; and a write-protection transmission conductor 21A, wherein the write-protection transmission conductor 21A has two ends that are extended to respectively form a write-protection grounding soldering section 211A and a write-protection spring section 212A, and the write-protection grounding soldering section 211A is located at one side of the sixth differential soldering section 201A that is distant from the fifth differential soldering section 191A, and the write-protection spring section 212A is located at one side of the seventh grounding spring section 182A that is distant from the fifth grounding spring section 162A.

Further, the insulative plastic body B is provided with a first signal constraining section 01B, an inspection signal constraining section 02B located at one side of the first signal constraining section 01B, a command reset constraining section 03B located at one side of the inspection signal constraining section 02B that is distant from the first signal constraining section 01B, a second grounding constraining section 04B located at one side of the command reset constraining section 03B that is distant from the inspection signal constraining section 02B, a second power constraining section 05B located at one side of the second grounding constraining section 04B that is distant from the command reset constraining section 03B, a second signal constraining section 06B located at one side of the second power constraining section 05B that is distant from the second grounding constraining section 04B, a sixth grounding constraining section 07B located at one side of the second signal constraining section 06B that is distant from the second power constraining section 05B, a first differential group constraining section 08B located at one side of the sixth grounding constraining section 07B that is distant from the second signal constraining section 06B, a backup constraining section 09B located at one side of the first signal constraining section 01B, a first grounding constraining section 10B located at one side of the backup constraining section 09B, a second differential group constraining section 11B located at one side of the first grounding constraining section 10B, a third grounding constraining section 12B located at one side of the second differential group constraining section 11B that is distant from the first grounding constraining section 10B, a first power constraining section 13B located at one side of the third grounding constraining section 12B that is distant from the second differential group constraining section 11B, a third differential group constraining section 14B located at one side of the first power constraining section 13B that is distant from the third grounding constraining section 12B, a fifth grounding constraining section 15B located at one side of the third differential group constraining section 14B that is distant from the first power constraining section 13B, and a seventh grounding constraining section 16B located at one side of the fifth grounding constraining section 15B that is distant from the third differential group constraining section 14B.

Further, an outside grounding transmission conductor of the transmission conductor assembly A is formed with a plurality of constraint fixing sections 22A; and the shielding case C is provided with a plurality of collision protection sections 2C beside an opening 1C thereof, and the collision protection sections 2C are connected with the transmission conductor assembly A.

Further, the fifth differential transmission conductor, the sixth differential transmission conductor, the first differential transmission conductor, the second differential transmission conductor, the third differential transmission conductor, and the fourth differential transmission conductor have widths that are greater than widths of the first signal transmission conductor, the inspection signal transmission conductor, the command reset transmission conductor, the second grounding transmission conductor, the fourth grounding transmission conductor, the second power transmission conductor, the second signal transmission conductor, the sixth grounding transmission conductor, the first grounding transmission conductor, the third grounding transmission conductor, the first power transmission conductor, the fifth grounding transmission conductor, the seventh grounding transmission conductor, and the backup transmission conductor.

The above description provides an understanding to the structure of the present invention, and based on a combination of such a structure, advantages of bettered high frequency performance, reduced capacitive effect, and suppressed electromagnetic radiation interference may be realized. Details for explanation are provided below.

A users may insert an SC card 200 through the opening 1C into the shielding case C, and the shielding case C may reinforce an overall structural strength by means of the collision protection sections 2C. The SC card 200, upon insertion into the shielding case C, may attaint an effect of constraining and fixing by means of the constraint fixing sections 22A, and is enabled to detect whether the SC card 200 de-activates the function of write protection by means of the write-protection spring section 212A getting into engagement with the SC card 200; the SC card 200 is brought into contact engagement with the transmission conductor assembly A, and for the transmission conductor assembly A, the first signal spring section 022A is received into and constrained in the first signal constraining section 01B; the inspection signal spring section 032A is received into and constrained in the inspection signal constraining section 02B; the command reset spring section 052A is received into and constrained in the command reset constraining section 03B; the second grounding spring section 082A is received into and constrained in the second grounding constraining section 04B; the second power spring section 122A is received into and constrained in the second power constraining section 05B; the second signal spring section 152A is received into and constrained in the second signal constraining section 06B; the sixth grounding spring section 172A is received into and constrained in the sixth grounding constraining section 07B; the fifth differential spring section 192A and the sixth differential spring section 202A are received into and constrained in the first differential group constraining section 08B; the backup spring section 012A is received into and constrained in the backup constraining section 09B; the first grounding spring section 042A is received into and constrained in the first grounding constraining section 10B; the first differential spring section 062A and the second differential spring section 072A are received into and constrained in the second differential group constraining section 11B; the third grounding spring section 092A is received into and constrained in the third grounding constraining section 12B; the first power spring section 112A is received into and constrained in the first power constraining section 13B; the third differential spring section 132A and the fourth differential spring section 142A are received into and constrained in the third differential group constraining section 14B; the fifth grounding spring section 162A is received into and constrained in the fifth grounding constraining section 15B; and the seventh grounding spring section 182A is received into and constrained in the seventh grounding constraining section 16B.

Further, contact points of the SC card 200 are set in contact engagement with the backup spring section 012A, the first signal spring section 022A, the inspection signal spring section 032A, the first grounding spring section 042A, the command reset spring section 052A, the first differential spring section 062A, the second differential spring section 072A, the second grounding spring section 082A, the third grounding spring section 092A, the fourth grounding spring section 102A, the first power spring section 112A, the second power spring section 122A, the third differential spring section 132A, the fourth differential spring section 142A, the second signal spring section 152A, the fifth grounding spring section 162A, the sixth grounding spring section 172A, the seventh grounding spring section 182A, the fifth differential spring section 192A, and the sixth differential spring section 202A of the transmission conductor assembly A, in order to establish connection between the SC card 200 and the transmission conductor assembly A. During transmission of signals, due to the first differential soldering section 061A and the second differential soldering section 071A, the third differential soldering section 131A and the fourth differential soldering section 141A, and the fifth differential soldering section 191A and the sixth differential soldering section 201A being respectively arranged side by side in a pairwise form, and the first differential soldering section 061A and the second differential soldering section 071A being provided, on two opposite sides thereof, with the first grounding soldering section 041A and the third grounding soldering section 091A, the third differential soldering section 131A and the fourth differential soldering section 141A being provided, on two opposite sides thereof, with the fourth grounding soldering section 101A and the fifth grounding soldering section 161A, and the fifth differential soldering section 191A and the sixth differential soldering section 201A being provided, on two opposite sides thereof, with the seventh grounding soldering section 181A and the write-protection grounding soldering section 211A, each differential group is provided, on two opposite sides thereof, with grounding sections, such that, by means of the above-described arrangement, advantages of bettering high frequency performance, reducing capacitive effect, and suppressing electromagnetic radiation interference can be realized.

We claim:

1. A card connector, the card connector comprising a transmission conductor assembly, wherein the transmission conductor assembly mainly comprises:
   a first signal transmission conductor, wherein the first signal transmission conductor has an end extended to form a first signal soldering section;
   an inspection signal transmission conductor, wherein the inspection signal transmission conductor has an end extended to form an inspection signal soldering section, and the inspection signal soldering section is located at one side of the first signal soldering section;
   a first grounding transmission conductor, wherein the first grounding transmission conductor has an end extended to form a first grounding soldering section, and the first grounding soldering section is located at one side of the inspection signal soldering section that is distant from the first signal soldering section;
   a command reset transmission conductor, wherein the command reset transmission conductor has an end extended to form a command reset soldering section, and the command reset soldering section is located at one side of the first grounding soldering section that is distant from the inspection signal soldering section;

a first differential transmission conductor, wherein the first differential transmission conductor has an end extended to form a first differential soldering section, and the first differential soldering section is located at one side of the command reset soldering section that is distant from the first grounding soldering section;

a second differential transmission conductor, wherein the second differential transmission conductor has an end extended to form a second differential soldering section, and the second differential soldering section is located at one side of the first differential soldering section that is distant from the command reset soldering section;

a second grounding transmission conductor, wherein the second grounding transmission conductor has an end extended to form a second grounding soldering section, and the second grounding soldering section is located at one side of the second differential soldering section that is distant from the first differential soldering section;

a third grounding transmission conductor, wherein the third grounding transmission conductor has an end extended to form a third grounding soldering section, and the third grounding soldering section is located at one side of the second grounding soldering section that is distant from the second differential soldering section;

a fourth grounding transmission conductor, wherein the fourth grounding transmission conductor has an end extended to form a fourth grounding soldering section, and the fourth grounding soldering section is located at one side of the third grounding soldering section that is distant from the second grounding soldering section;

a first power transmission conductor, wherein the first power transmission conductor has an end extended to form a first power soldering section, and the first power soldering section is located at one side of the fourth grounding soldering section that is distant from the third grounding soldering section;

a second power transmission conductor, wherein the second power transmission conductor has an end extended to form a second power soldering section, and the second power soldering section is located at one side of the first power soldering section that is distant from the fourth grounding soldering section;

a third differential transmission conductor, wherein the third differential transmission conductor has an end extended to form a third differential soldering section, and the third differential soldering section is located at one side of the second power soldering section that is distant from the first power soldering section;

a fourth differential transmission conductor, wherein the fourth differential transmission conductor has an end extended to form a fourth differential soldering section, and the fourth differential soldering section is located at one side of the third differential soldering section that is distant from the second power soldering section;

a second signal transmission conductor, wherein the second signal transmission conductor has an end extended to form a second signal soldering section, and the second signal soldering section is located at one side of the fourth differential soldering section that is distant from the third differential soldering section;

a fifth grounding transmission conductor, wherein the fifth grounding transmission conductor has an end extended to form a fifth grounding soldering section, and the fifth grounding soldering section is located at one side of the second signal soldering section that is distant from the fourth differential soldering section;

a sixth grounding transmission conductor, wherein the sixth grounding transmission conductor has an end extended to form a sixth grounding soldering section, and the sixth grounding soldering section is located at one side of the fifth grounding soldering section that is distant from the second signal soldering section;

a fifth differential transmission conductor, wherein the fifth differential transmission conductor has an end extended to form a fifth differential soldering section, and the fifth differential soldering section is located at one side of the sixth grounding soldering section that is distant from the fifth grounding soldering section;

a sixth differential transmission conductor, wherein the sixth differential transmission conductor has an end extended to form a sixth differential soldering section, and the sixth differential soldering section is located at one side of the fifth differential soldering section that is distant from the sixth grounding soldering section; and a write-protection transmission conductor, wherein the write-protection transmission conductor has an end extended to form a write-protection grounding soldering section, and the write-protection grounding soldering section is located at one side of the sixth differential soldering section that is distant from the fifth differential soldering section.

2. The card connector according to claim 1, wherein an insulative plastic body is arranged outside the transmission conductor assembly, and the insulative plastic body is provided with a first signal constraining section, an inspection signal constraining section located at one side of the first signal constraining section, a command reset constraining section located at one side of the inspection signal constraining section that is distant from the first signal constraining section, a second grounding constraining section located at one side of the command reset constraining section that is distant from the inspection signal constraining section, a second power constraining section located at one side of the second grounding constraining section that is distant from the command reset constraining section, a second signal constraining section located at one side of the second power constraining section that is distant from the second grounding constraining section, a sixth grounding constraining section located at one side of the second signal constraining section that is distant from the second power constraining section, a first differential group constraining section located at one side of the sixth grounding constraining section that is distant from the second signal constraining section, a first grounding constraining section located at one side of the inspection signal constraining section, a second differential group constraining section located at one side of the first grounding constraining section, a third grounding constraining section located at one side of the second differential group constraining section that is distant from the first grounding constraining section, a first power constraining section located at one side of the third grounding constraining section that is distant from the second differential group constraining section, a third differential group constraining section located at one side of the first power constraining section that is distant from the third grounding constraining section, and a fifth grounding constraining section located at one side of the third differential group constraining section that is distant from the first power constraining section.

3. The card connector according to claim 1, wherein the transmission conductor assembly is formed with a plurality of constraint fixing sections.

4. The card connector according to claim 1, wherein a shielding case is arranged outside the transmission conductor assembly, and the shielding case is provided with a plurality of collision protection sections, and the collision protection sections are connected to the transmission conductor assembly.

5. The card connector according to claim 1, wherein the fifth differential transmission conductor, the sixth differential transmission conductor, the first differential transmission conductor, the second differential transmission conductor, the third differential transmission conductor, and the fourth differential transmission conductor have widths that are greater than widths of the first signal transmission conductor, the inspection signal transmission conductor, the command reset transmission conductor, the second grounding transmission conductor, the fourth grounding transmission conductor, the second power transmission conductor, the second signal transmission conductor, the sixth grounding transmission conductor, the first grounding transmission conductor, the third grounding transmission conductor, the first power transmission conductor, and the fifth grounding transmission conductor.

6. A card connector, the card connector comprising a transmission conductor assembly, wherein the transmission conductor assembly mainly comprises:
 a first signal transmission conductor, wherein the first signal transmission conductor has two ends that are extended to respectively form a first signal soldering section and a first signal spring section;
 an inspection signal transmission conductor, wherein the inspection signal transmission conductor has two ends that are extended to respectively form an inspection signal soldering section and an inspection signal spring section, and the inspection signal soldering section is located at one side of the first signal soldering section, and the inspection signal spring section is located at one side of the first signal spring section;
 a first grounding transmission conductor, wherein the first grounding transmission conductor has two ends that are extended to respectively form a first grounding soldering section and a first grounding spring section, and the first grounding soldering section is located at one side of the inspection signal soldering section that is distant from the first signal soldering section;
 a command reset transmission conductor, wherein the command reset transmission conductor has two ends that are extended to respectively form a command reset soldering section and a command reset spring section, and the command reset soldering section is located at one side of the first grounding soldering section that is distant from the inspection signal soldering section, and the command reset spring section is located at one side of the inspection signal spring section that is distant from the first signal spring section;
 a first differential transmission conductor, wherein the first differential transmission conductor has two ends that are extended to respectively form a first differential soldering section and a first differential spring section, and the first differential soldering section is located at one side of the command reset soldering section that is distant from the first grounding soldering section, and the first differential spring section is located at one side of the first grounding spring section;
 a second differential transmission conductor, wherein the second differential transmission conductor has two ends that are extended to respectively form a second differential soldering section and a second differential spring section, and the second differential soldering section is located at one side of the first differential soldering section that is distant from the command reset soldering section, and the second differential spring section is located at one side of the first differential spring section that is distant from the first grounding spring section;
 a second grounding transmission conductor, wherein the second grounding transmission conductor has two ends that are extended to respectively form a second grounding soldering section and a second grounding spring section, and the second grounding soldering section is located at one side of the second differential soldering section that is distant from the first differential soldering section, and the second grounding spring section is located at one side of the command reset spring section that is distant from the inspection signal spring section;
 a third grounding transmission conductor, wherein the third grounding transmission conductor has two ends that are extended to respectively form a third grounding soldering section and a third grounding spring section, and the third grounding soldering section is located at one side of the second grounding soldering section that is distant from the second differential soldering section, and the third grounding spring section is located at one side of the second differential spring section that is distant from the first differential spring section;
 a fourth grounding transmission conductor, wherein the fourth grounding transmission conductor has two ends that are extended to respectively form a fourth grounding soldering section and a fourth grounding spring section, and the fourth grounding soldering section is located at one side of the third grounding soldering section that is distant from the second grounding soldering section, and the fourth grounding spring section is located at one side of the second grounding spring section that is distant from the command reset spring section;
 a first power transmission conductor, wherein the first power transmission conductor has two ends that are extended to respectively form a first power soldering section and a first power spring section, and the first power soldering section is located at one side of the fourth grounding soldering section that is distant from the third grounding soldering section, and the first power spring section is located at one side of the third grounding spring section that is distant from the second differential spring section;
 a second power transmission conductor, wherein the second power transmission conductor has two ends that are extended to respectively form a second power soldering section and a second power spring section, and the second power soldering section is located at one side of the first power soldering section that is distant from the fourth grounding soldering section, and the second power spring section is located at one side of the fourth grounding spring section that is distant from the second grounding spring section;
 a third differential transmission conductor, wherein the third differential transmission conductor has two ends that are extended to respectively form a third differential soldering section and a third differential spring section, and the third differential soldering section is located at one side of the second power soldering section that is distant from the first power soldering section, and the third differential spring section is located at one side of the first power spring section that is distant from the third grounding spring section;

a fourth differential transmission conductor, wherein the fourth differential transmission conductor has two ends that are extended to respectively form a fourth differential soldering section and a fourth differential spring section, and the fourth differential soldering section is located at one side of the third differential soldering section that is distant from the second power soldering section, and the fourth differential spring section is located at one side of the third differential spring section that is distant from the first power spring section;

a second signal transmission conductor, wherein the second signal transmission conductor has two ends that are extended to respectively form a second signal soldering section and a second signal spring section, and the second signal soldering section is located at one side of the fourth differential soldering section that is distant from the third differential soldering section, and the second signal spring section is located at one side of the second power spring section that is distant from the fourth grounding spring section;

a fifth grounding transmission conductor, wherein the fifth grounding transmission conductor has two ends that are extended to respectively form a fifth grounding soldering section and a fifth grounding spring section, and the fifth grounding soldering section is located at one side of the second signal soldering section that is distant from the fourth differential soldering section, and the fifth grounding spring section is located at one side of the fourth differential spring section that is distant from the third differential spring section;

a sixth grounding transmission conductor, wherein the sixth grounding transmission conductor has two ends that are extended to respectively form a sixth grounding soldering section and a sixth grounding spring section, and the sixth grounding soldering section is located at one side of the fifth grounding soldering section that is distant from the second signal soldering section, and the sixth grounding spring section is located at one side of the second signal spring section that is distant from the second power spring section;

a fifth differential transmission conductor, wherein the fifth differential transmission conductor has two ends that are extended to respectively form a fifth differential soldering section and a fifth differential spring section, and the fifth differential soldering section is located at one side of the sixth grounding soldering section that is distant from the fifth grounding soldering section, and the fifth differential spring section is located at one side of the sixth grounding spring section that is distant from the second signal spring section;

a sixth differential transmission conductor, wherein the sixth differential transmission conductor has two ends that are extended to respectively form a sixth differential soldering section and a sixth differential spring section, and the sixth differential soldering section is located at one side of the fifth differential soldering section that is distant from the sixth grounding soldering section, and the sixth differential spring section is located at one side of the fifth differential spring section that is distant from the sixth grounding spring section; and a write-protection transmission conductor, wherein the write-protection transmission conductor has two ends that are extended to respectively form a write-protection grounding soldering section and a write-protection spring section, and the write-protection grounding soldering section is located at one side of the sixth differential soldering section that is distant from the fifth differential soldering section, and the write-protection spring section is located at one side of the seventh grounding spring section that is distant from the fifth grounding spring section.

7. The card connector according to claim 6, wherein an insulative plastic body is arranged outside the transmission conductor assembly, and the insulative plastic body is provided with a first signal constraining section, an inspection signal constraining section located at one side of the first signal constraining section, a command reset constraining section located at one side of the inspection signal constraining section that is distant from the first signal constraining section, a second grounding constraining section located at one side of the command reset constraining section that is distant from the inspection signal constraining section, a second power constraining section located at one side of the second grounding constraining section that is distant from the command reset constraining section, a second signal constraining section located at one side of the second power constraining section that is distant from the second grounding constraining section, a sixth grounding constraining section located at one side of the second signal constraining section that is distant from the second power constraining section, a first differential group constraining section located at one side of the sixth grounding constraining section that is distant from the second signal constraining section, a first grounding constraining section located at one side of the inspection signal constraining section, a second differential group constraining section located at one side of the first grounding constraining section, a third grounding constraining section located at one side of the second differential group constraining section that is distant from the first grounding constraining section, a first power constraining section located at one side of the third grounding constraining section that is distant from the second differential group constraining section, a third differential group constraining section located at one side of the first power constraining section that is distant from the third grounding constraining section, and a fifth grounding constraining section located at one side of the third differential group constraining section that is distant from the first power constraining section.

8. The card connector according to claim 6, wherein the transmission conductor assembly is formed with a plurality of constraint fixing sections.

9. The card connector according to claim 6, wherein a shielding case is arranged outside the transmission conductor assembly, and the shielding case is provided with a plurality of collision protection sections, and the collision protection sections are connected to the transmission conductor assembly.

10. The card connector according to claim 6, wherein the fifth differential transmission conductor, the sixth differential transmission conductor, the first differential transmission conductor, the second differential transmission conductor, the third differential transmission conductor, and the fourth differential transmission conductor have widths that are greater than widths of the first signal transmission conductor, the inspection signal transmission conductor, the command reset transmission conductor, the second grounding transmission conductor, the fourth grounding transmission conductor, the second power transmission conductor, the second signal transmission conductor, the sixth grounding transmission conductor, the first grounding transmission conductor, the third grounding transmission conductor, the first power transmission conductor, and the fifth grounding transmission conductor.

11. A card connector, the card connector comprising a transmission conductor assembly, wherein the transmission conductor assembly mainly comprises:
- a backup transmission conductor, wherein the backup transmission conductor has an end extended to form a backup soldering section;
- a first signal transmission conductor, wherein the first signal transmission conductor has an end extended to form a first signal soldering section, and the first signal soldering section is located at one side of the backup soldering section;
- an inspection signal transmission conductor, wherein the inspection signal transmission conductor has an end extended to form an inspection signal soldering section, and the inspection signal soldering section is located at one side of the first signal soldering section that is distant from the backup soldering section;
- a first grounding transmission conductor, wherein the first grounding transmission conductor has an end extended to form a first grounding soldering section, and the first grounding soldering section is located at one side of the inspection signal soldering section that is distant from the first signal soldering section;
- a command reset transmission conductor, wherein the command reset transmission conductor has an end extended to form a command reset soldering section, and the command reset soldering section is located at one side of the first grounding soldering section that is distant from the inspection signal soldering section;
- a first differential transmission conductor, wherein the first differential transmission conductor has an end extended to form a first differential soldering section, and the first differential soldering section is located at one side of the command reset soldering section that is distant from the first grounding soldering section;
- a second differential transmission conductor, wherein the second differential transmission conductor has an end extended to form a second differential soldering section, and the second differential soldering section is located at one side of the first differential soldering section that is distant from the command reset soldering section;
- a second grounding transmission conductor, wherein the second grounding transmission conductor has an end extended to form a second grounding soldering section, and the second grounding soldering section is located at one side of the second differential soldering section that is distant from the first differential soldering section;
- a third grounding transmission conductor, wherein the third grounding transmission conductor has an end extended to form a third grounding soldering section, and the third grounding soldering section is located at one side of the second grounding soldering section that is distant from the second differential soldering section;
- a fourth grounding transmission conductor, wherein the fourth grounding transmission conductor has an end extended to form a fourth grounding soldering section, and the fourth grounding soldering section is located at one side of the third grounding soldering section that is distant from the second grounding soldering section;
- a first power transmission conductor, wherein the first power transmission conductor has an end extended to form a first power soldering section, and the first power soldering section is located at one side of the fourth grounding soldering section that is distant from the third grounding soldering section;
- a second power transmission conductor, wherein the second power transmission conductor has an end extended to form a second power soldering section, and the second power soldering section is located at one side of the first power soldering section that is distant from the fourth grounding soldering section;
- a third differential transmission conductor, wherein the third differential transmission conductor has an end extended to form a third differential soldering section, and the third differential soldering section is located at one side of the second power soldering section that is distant from the first power soldering section;
- a fourth differential transmission conductor, wherein the fourth differential transmission conductor has an end extended to form a fourth differential soldering section, and the fourth differential soldering section is located at one side of the third differential soldering section that is distant from the second power soldering section;
- a second signal transmission conductor, wherein the second signal transmission conductor has an end extended to form a second signal soldering section, and the second signal soldering section is located at one side of the fourth differential soldering section that is distant from the third differential soldering section;
- a fifth grounding transmission conductor, wherein the fifth grounding transmission conductor has an end extended to form a fifth grounding soldering section, and the fifth grounding soldering section is located at one side of the second signal soldering section that is distant from the fourth differential soldering section;
- a sixth grounding transmission conductor, wherein the sixth grounding transmission conductor has an end extended to form a sixth grounding soldering section, and the sixth grounding soldering section is located at one side of the fifth grounding soldering section that is distant from the second signal soldering section;
- a seventh grounding transmission conductor, wherein the seventh grounding transmission conductor has an end extended to form a seventh grounding soldering section, and the seventh grounding soldering section is located at one side of the sixth grounding soldering section that is distant from the fifth grounding soldering section;
- a fifth differential transmission conductor, wherein the fifth differential transmission conductor has an end extended to form a fifth differential soldering section, and the fifth differential soldering section is located at one side of the seventh grounding soldering section that is distant from the sixth grounding soldering section;
- a sixth differential transmission conductor, wherein the sixth differential transmission conductor has an end extended to form a sixth differential soldering section, and the sixth differential soldering section is located at one side of the fifth differential soldering section that is distant from the seventh grounding soldering section; and
- a write-protection transmission conductor, the write-protection transmission conductor has an end extended to form a write-protection grounding soldering section, and the write-protection grounding soldering section is located at one side of the sixth differential soldering section that is distant from the fifth differential soldering section.

12. The card connector according to claim 11, wherein an insulative plastic body is arranged outside the transmission conductor assembly, and the insulative plastic body is provided with a first signal constraining section, an inspection signal constraining section located at one side of the first signal constraining section, a command reset constraining section located at one side of the inspection signal constraining section that is distant from the first signal constraining section, a second grounding constraining section located at one side of the command reset constraining section that is distant from the inspection signal constraining section, a second power constraining section located at one side of the second grounding constraining section that is distant from the command reset constraining section, a second signal constraining section located at one side of the second power constraining section that is distant from the second grounding constraining section, a sixth grounding constraining section located at one side of the second signal constraining section that is distant from the second power constraining section, a first differential group constraining section located at one side of the sixth grounding constraining section that is distant from the second signal constraining section, a backup constraining section located at one side of the first signal constraining section, a first grounding constraining section located at one side of the backup constraining section, a second differential group constraining section located at one side of the first grounding constraining section, a third grounding constraining section located at one side of the second differential group constraining section that is distant from the first grounding constraining section, a first power constraining section located at one side of the third grounding constraining section that is distant from the second differential group constraining section, a third differential group constraining section located at one side of the first power constraining section that is distant from the third grounding constraining section, a fifth grounding constraining section located at one side of the third differential group constraining section that is distant from the first power constraining section, and a seventh grounding constraining section located at one side of the fifth grounding constraining section that is distant from the third differential group constraining section.

13. The card connector according to claim 11, wherein the transmission conductor assembly is formed with a plurality of constraint fixing sections.

14. The card connector according to claim 11, wherein a shielding case is arranged outside the transmission conductor assembly, and the shielding case is provided with a plurality of collision protection sections, and the collision protection sections are connected to the transmission conductor assembly.

15. The card connector according to claim 11, wherein the fifth differential transmission conductor, the sixth differential transmission conductor, the first differential transmission conductor, the second differential transmission conductor, the third differential transmission conductor, and the fourth differential transmission conductor have widths that are greater than widths of the first signal transmission conductor, the inspection signal transmission conductor, the command reset transmission conductor, the second grounding transmission conductor, the fourth grounding transmission conductor, the second power transmission conductor, the second signal transmission conductor, the sixth grounding transmission conductor, the first grounding transmission conductor, the third grounding transmission conductor, the first power transmission conductor, the fifth grounding transmission conductor, the seventh grounding transmission conductor, and the backup transmission conductor.

16. A card connector, the card connector comprising a transmission conductor assembly, wherein the transmission conductor assembly mainly comprises:
a backup transmission conductor, wherein the backup transmission conductor has two ends that are extended to respectively form a backup soldering section and a backup spring section;
a first signal transmission conductor, wherein the first signal transmission conductor has two ends that are extended to respectively form a first signal soldering section and a first signal spring section, and the first signal soldering section is located at one side of the backup soldering section;
an inspection signal transmission conductor, wherein the inspection signal transmission conductor has two ends that are extended to respectively form an inspection signal soldering section and an inspection signal spring section, and the inspection signal soldering section is located at one side of the first signal soldering section that is distant from the backup soldering section, the inspection signal spring section is located at one side of the first signal spring section;
a first grounding transmission conductor, wherein the first grounding transmission conductor has two ends that are extended to respectively form a first grounding soldering section and a first grounding spring section, and the first grounding soldering section is located at one side of the inspection signal soldering section that is distant from the first signal soldering section, and the first grounding spring section is located at one side of the backup spring section;
a command reset transmission conductor, wherein the command reset transmission conductor has two ends that are extended to respectively form a command reset soldering section and a command reset spring section, and the command reset soldering section is located at one side of the first grounding soldering section that is distant from the inspection signal soldering section, and the command reset spring section is located at one side of the inspection signal spring section that is distant from the first signal spring section;
a first differential transmission conductor, wherein the first differential transmission conductor has two ends that are extended to respectively form a first differential soldering section and a first differential spring section, and the first differential soldering section is located at one side of the command reset soldering section that is distant from the first grounding soldering section, and the first differential spring section is located at one side of the first grounding spring section;
a second differential transmission conductor, wherein the second differential transmission conductor has two ends that are extended to respectively form a second differential soldering section and a second differential spring section, and the second differential soldering section is located at one side of the first differential soldering section that is distant from the command reset soldering section, and the second differential spring section is located at one side of the first differential spring section that is distant from the first grounding spring section;
a second grounding transmission conductor, wherein the second grounding transmission conductor has two ends that are extended to respectively form a second grounding soldering section and a second grounding spring section, and the second grounding soldering section is located at one side of the second differential soldering section that is distant from the first differential soldering section, and the second grounding spring section is located at one side of the command reset spring section that is distant from the inspection signal spring section;

a third grounding transmission conductor, wherein the third grounding transmission conductor has two ends that are extended to respectively form a third grounding soldering section and a third grounding spring section, and the third grounding soldering section is located at one side of the second grounding soldering section that is distant from the second differential soldering section, and the third grounding spring section is located at one side of the second differential spring section that is distant from the first differential spring section;

a fourth grounding transmission conductor, wherein the fourth grounding transmission conductor has two ends that are extended to respectively form a fourth grounding soldering section and a fourth grounding spring section, and the fourth grounding soldering section is located at one side of the third grounding soldering section that is distant from the second grounding soldering section, and the fourth grounding spring section is located at one side of the second grounding spring section that is distant from the command reset spring section;

a first power transmission conductor, wherein the first power transmission conductor has two ends that are extended to respectively form a first power soldering section and a first power spring section, and the first power soldering section is located at one side of the fourth grounding soldering section that is distant from the third grounding soldering section, and the first power spring section is located at one side of the third grounding spring section that is distant from the second differential spring section;

a second power transmission conductor, wherein the second power transmission conductor has two ends that are extended to respectively form a second power soldering section and a second power spring section, and the second power soldering section is located at one side of the first power soldering section that is distant from the fourth grounding soldering section, and the second power spring section is located at one side of the fourth grounding spring section that is distant from the second grounding spring section;

a third differential transmission conductor, wherein the third differential transmission conductor has two ends that are extended to respectively form a third differential soldering section and a third differential spring section, and the third differential soldering section is located at one side of the second power soldering section that is distant from the first power soldering section, and the third differential spring section is located at one side of the first power spring section that is distant from the third grounding spring section;

a fourth differential transmission conductor, wherein the fourth differential transmission conductor has two ends that are extended to respectively form a fourth differential soldering section and a fourth differential spring section, and the fourth differential soldering section is located at one side of the third differential soldering section that is distant from the second power soldering section, and the fourth differential spring section is located at one side of the third differential spring section that is distant from the first power spring section;

a second signal transmission conductor, wherein the second signal transmission conductor has two ends that are extended to respectively form a second signal soldering section and a second signal spring section, and the second signal soldering section is located at one side of the fourth differential soldering section that is distant from the third differential soldering section, and the second signal spring section is located at one side of the second power spring section that is distant from the fourth grounding spring section;

a fifth grounding transmission conductor, wherein the fifth grounding transmission conductor has two ends that are extended to respectively form a fifth grounding soldering section and a fifth grounding spring section, and the fifth grounding soldering section is located at one side of the second signal soldering section that is distant from the fourth differential soldering section, the fifth grounding spring section is located at one side of the fourth differential spring section that is distant from the third differential spring section;

a sixth grounding transmission conductor, wherein the sixth grounding transmission conductor has two ends that are extended to respectively form a sixth grounding soldering section and a sixth grounding spring section, and the sixth grounding soldering section is located at one side of the fifth grounding soldering section that is distant from the second signal soldering section, and the sixth grounding spring section is located at one side of the second signal spring section that is distant from the second power spring section;

a seventh grounding transmission conductor, wherein the seventh grounding transmission conductor has two ends that are extended to respectively form a seventh grounding soldering section and a seventh grounding spring section, and the seventh grounding soldering section is located at one side of the sixth grounding soldering section that is distant from the fifth grounding soldering section, and the seventh grounding spring section is located at one side of the fifth grounding spring section that is distant from the fourth differential spring section;

a fifth differential transmission conductor, wherein the fifth differential transmission conductor has two ends that are extended to respectively form a fifth differential soldering section and a fifth differential spring section, and the fifth differential soldering section is located at one side of the seventh grounding soldering section that is distant from the sixth grounding soldering section, and the fifth differential spring section is located at one side of the sixth grounding spring section that is distant from the second signal spring section;

a sixth differential transmission conductor, wherein the sixth differential transmission conductor has two ends that are extended to respectively form a sixth differential soldering section and a sixth differential spring section, and the sixth differential soldering section is located at one side of the fifth differential soldering section that is distant from the seventh grounding soldering section, and the sixth differential spring section is located at one side of the fifth differential spring section that is distant from the sixth grounding spring section; and a write-protection transmission conductor, wherein the write-protection transmission conductor has two ends that are extended to respectively form a write-protection grounding soldering section and a write-protection spring section, and the write-protection grounding soldering section is located at one side of the sixth differential soldering section that is distant from the fifth differential soldering section, and the write-protection spring section is located at one side of the seventh grounding spring section that is distant from the fifth grounding spring section.

17. The card connector according to claim 16, wherein an insulative plastic body is arranged outside the transmission conductor assembly, and the insulative plastic body is provided with a first signal constraining section, an inspection signal constraining section located at one side of the first signal constraining section, a command reset constraining section located at one side of the inspection signal constraining section that is distant from the first signal constraining section, a second grounding constraining section located at one side of the command reset constraining section that is distant from the inspection signal constraining section, a second power constraining section located at one side of the second grounding constraining section that is distant from the command reset constraining section, a second signal constraining section located at one side of the second power constraining section that is distant from the second grounding constraining section, a sixth grounding constraining section located at one side of the second signal constraining section that is distant from the second power constraining section, a first differential group constraining section located at one side of the sixth grounding constraining section that is distant from the second signal constraining section, a backup constraining section located at one side of the first signal constraining section, a first grounding constraining section located at one side of the backup constraining section, a second differential group constraining section located at one side of the first grounding constraining section, a third grounding constraining section located at one side of the second differential group constraining section that is distant from the first grounding constraining section, a first power constraining section located at one side of the third grounding constraining section that is distant from the second differential group constraining section, a third differential group constraining section located at one side of the first power constraining section that is distant from the third grounding constraining section, a fifth grounding constraining section located at one side of the third differential group constraining section that is distant from the first power constraining section, and a seventh grounding constraining section located at one side of the fifth grounding constraining section that is distant from the third differential group constraining section.

18. The card connector according to claim 16, wherein the transmission conductor assembly is formed with a plurality of constraint fixing sections.

19. The card connector according to claim 16, wherein a shielding case is arranged outside the transmission conductor assembly, and the shielding case is provided with a plurality of collision protection sections, and the collision protection sections are connected to the transmission conductor assembly.

20. The card connector according to claim 16, wherein the fifth differential transmission conductor, the sixth differential transmission conductor, the first differential transmission conductor, the second differential transmission conductor, the third differential transmission conductor, and the fourth differential transmission conductor have widths that are greater than widths of the first signal transmission conductor, the inspection signal transmission conductor, the command reset transmission conductor, the second grounding transmission conductor, the fourth grounding transmission conductor, the second power transmission conductor, the second signal transmission conductor, the sixth grounding transmission conductor, the first grounding transmission conductor, the third grounding transmission conductor, the first power transmission conductor, the fifth grounding transmission conductor, the seventh grounding transmission conductor, and the backup transmission conductor.

\* \* \* \* \*